United States Patent
Ito et al.

(10) Patent No.: US 6,189,638 B1
(45) Date of Patent: Feb. 20, 2001

(54) REAR FORK ATTACHMENT STRUCTURE FOR MOTORCYCLE

(75) Inventors: Hiroyuki Ito; Hidetoshi Toyoda; Satoshi Hirayanagi, all of Saitama (JP)

(73) Assignee: Honda Giken Kogyo Kabushiki Kaisha, Tokyo (JP)

(*) Notice: Under 35 U.S.C. 154(b), the term of this patent shall be extended for 0 days.

(21) Appl. No.: 09/393,155

(22) Filed: Sep. 10, 1999

(30) Foreign Application Priority Data

Sep. 11, 1998 (JP) .................................................. 10-259040

(51) Int. Cl.[7] ................................................... B62D 61/02
(52) U.S. Cl. ........................................... 180/227; 280/284
(58) Field of Search .................................. 180/219, 227; 280/284, 285, 286

(56) References Cited

U.S. PATENT DOCUMENTS 5,964,312 * 10/1999 Maldonado ........................... 180/227

FOREIGN PATENT DOCUMENTS 62-60491 U  4/1987 (JP) .
6-87481 *  3/1994 (JP) .

* cited by examiner

*Primary Examiner*—Kevin Hurley
(74) *Attorney, Agent, or Firm*—Birch, Stewart, Kolasch & Birch, LLP (57) ABSTRACT

To attach right and left arms of a rear fork reliably to a pivot portion and right and left pivot supports without undue attachment loads imposed thereon. A motorcycle having a rear fork attachment structure includes an engine disposed substantially centrally in a vehicle body, right and left arms of a rear fork extending over right and left sides of a pivot portion of the engine, right and left pivot supports depending from a vehicle body frame extend over right and left sides of the right and left arms, and the left pivot support, the left arm, the pivot portion, the right arm, and the right pivot support coupled together by a single pivot shaft. Furthermore, the right and left pivot supports have adjustment bolts having respective pivot shaft insertion holes, and the adjustment bolts adjust distances between the right and left arms and the right and left pivot supports.

16 Claims, 7 Drawing Sheets

REAR FORK ATTACHMENT STRUCTURE FOR MOTORCYCLE

BACKGROUND OF THE INVENTION

1. Field of the invention

The present invention relates to a rear fork attachment structure for motorcycles.

2. Description of Related Art

Many motorcycles have a rear wheel suspension device including a rear fork (corresponding to a swing arm) for a rear wheel which is vertically swingably mounted on a vehicle body frame, and a rear suspension by which the rear fork is suspended from the vehicle body frame. One such rear wheel suspension device is known from Japanese utility model publication No. 62-60491 entitled "Swing arm attachment structure for motorcycles", for example.

According to the above related art, as shown in FIG. 1 of the above publication, an attachment 4 of a swing arm extends between right and left ends 1', 1 of a frame having a predetermined width, and the right and left ends 1' and 1 and the attachment 4 are coupled together by a pivot bolt 11 (the reference numerals shown herein and below are the same as those in the publication).

According to the above related art, a collar 8 held against an inner end surface of the right end 1', bearings 9, and a collar 7 are fitted over the pivot bolt 11, and fastened together with the right and left ends 1', 1 by the pivot bolt 11 and a nut 13. Since these parts 7 through 9, right and left ends 1', 1, and the attachment 4 have manufacturing tolerances, it is necessary to provide a clearance in view of an assembling tolerance between the right and left ends 1', 1. In order to assemble the parts 7 through 9 between the right and left ends 1', 1 without any clearance, an adjustment collar 10 is employed to make axial adjustments along the pivot bolt 11. Since there is no clearance, when the pivot bolt 11 and the nut 13 are tightened together, any bending moments due to the tightening forces do not act on the right and left ends 1', 1.

An engine is integrally mounted on the frame and has an engine case which is extremely rigid as is well known in the art. If an extremely rigid case is used, then it can increase the rigidity of a portion of the frame on which a rear fork is mounted. For example, the rear fork is supported by the engine case and the right and left ends of the frame. Consequently, the rigidity with which to support the rear fork is higher than if the rear fork is supported by only the right and left ends 1', 1 of the frame as is the case with the prior art.

However, unless both a clearance between the rear fork and the engine case and a clearance between the rear fork and the frame are eliminated, when the pivot bolt 11 and the nut 13 are tightened together, bending moments due to the tightening forces act on the rear fork and the frame. Therefore, it is necessary to take some measures against the application of such bending moments.

SUMMARY OF THE INVENTION

It is an object of the present invention to provide a technique for supporting a rear fork with a pivot portion of an engine and right and left pivot supports of a vehicle body frame while attaching right and left arms of the rear fork reliably to the pivot portion and the right and left pivot supports without undue attachment loads imposed thereon.

To achieve the above object, according to a first aspect of the present invention, a rear fork attachment structure is for a motorcycle having an engine disposed substantially centrally in a vehicle body, right and left arms of a rear fork extending over right and left sides of a pivot portion of the engine, right and left pivot supports depending from the vehicle body frame and extending over right and left sides of the right and left arms. Furthermore, the left pivot support, the left arm, the pivot portion, the right arm, and the right pivot support are coupled together by a single pivot shaft. The rear fork attachment structure includes the right and left pivot supports having adjustment bolts with respective pivot shaft insertion holes, the adjustment bolts being capable of adjusting distances between the right and left arms and the right and left pivot supports.

The centers of the right and left pivot supports are aligned with the center of the pivot portion, and the right and left arms are pulled in between the right and left pivot supports and the pivot portion, followed by aligning the centers of right and left attachments with the center of the pivot portion.

The distance between the right arm and the right pivot support is adjusted by the right adjustment bolt for eliminating a clearance between the pivot portion and the right arm and a clearance between the right arm and the right pivot support. The distance between the left arm and the left pivot support is adjusted by the left adjustment bolt for eliminating a clearance between the pivot portion left arm and a clearance between the left arm and left pivot support.

Since there is no clearance, when the pivot shaft is tightened from both sides of the right and left pivot supports, any bending moments due to the tightening forces do not act on the vehicle body frame and the rear fork. Therefore, the right and left arms of the rear fork can reliably be mounted on the pivot portion of the engine and the right and left pivot supports without undue attachment loads imposed thereon. Furthermore, no special dimensional management for the parts is necessary in the area where the rear fork is mounted.

According to the first aspect of the present invention, the rear fork is pivotally supported on the pivot shaft by bearings, the bearings including a bearing mounted in one of the right and left arms so as to have a prescribed axial position thereof and a bearing mounted in the other of the right and left arms so as not to have a prescribed axial position thereof.

When one of the adjustment bolts on the right and left arms is adjusted, the position of the rear fork with respect to the center of the vehicle body is automatically established. Accordingly, the right and left adjustment bolts may simply be adjusted without paying attention to the positioning of the rear fork, and hence the adjustment operation can easily be performed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

An embodiment of the present invention will be described below with reference to the accompanying drawings. The terms "front", "rear", "left", "right", "upper", "lower" and similar directional terms used herein refer to directions as viewed from the rider of the motorcycle, and Fr, Rr, L, and R represent front, rear, right and left sides, respectively. The figures shall be viewed in accordance with the orientation of the reference characters.

Figure 1:
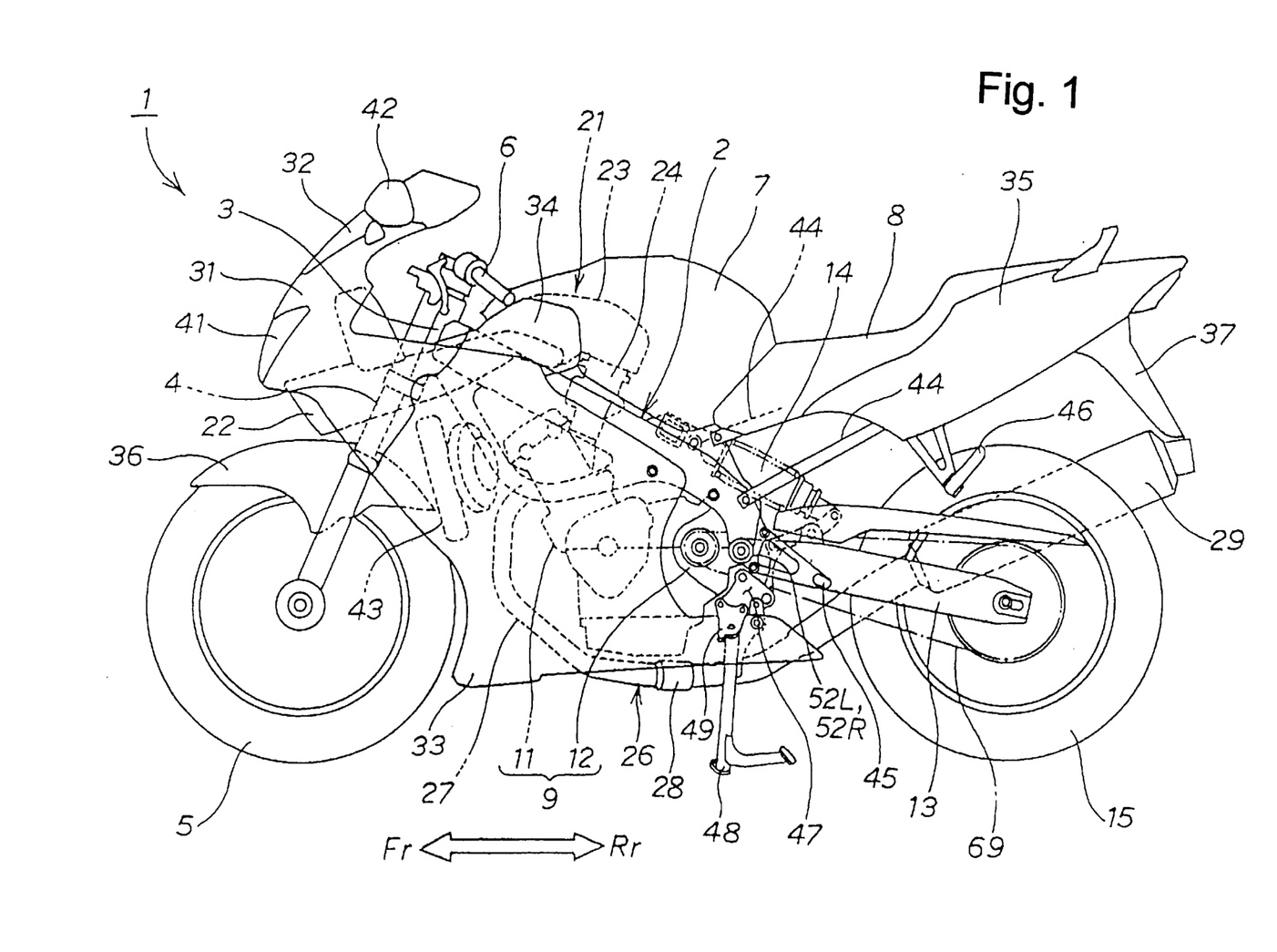
FIG. 1 is a side elevational view of a motorcycle according to the present invention.

FIG. 1 is a side elevational view of a motorcycle according to the present invention. The motorcycle 1 comprises a vehicle body frame (a vehicle body) 2, a front fork 4 mounted on a head pipe 3 of the vehicle body frame 2, a front wheel 5 mounted on the front fork 4, a handle 6 coupled to the front fork 4, a fuel tank 7 mounted astride of an upper front portion of the vehicle body frame 2, a seat 8 mounted on an upper rear portion of the vehicle body frame 2, a power unit (a combination of an engine 11 in a front region and a transmission 12 in a rear region) 9 mounted on a lower front portion of the vehicle body frame 2, a rear fork (corresponding to a swing arm) 13 mounted on a lower rear portion of the vehicle body frame 2, a rear suspension 14 by which an intermediate portion of the rear fork 13 is suspended from the vehicle body frame 2, and a rear wheel 15 mounted on a rear end of the rear fork.

The engine 11 has an intake system 21 comprising an inlet duct 22, an air cleaner 23, and a carburetor 24.

The engine 11 has an exhaust system 26 comprising four exhaust pipes 27 (only one shown) connected to exhaust ports of the engine 11, a common pipe 28 for collecting exhaust gases from the exhaust pipes 27, and a muffler 29.

The motorcycle 1 is fully-cowled and two-wheeled, and includes an upper cowl 31 covering a front upper portion of the vehicle body frame 2, a wind screen 32 mounted on an upper portion of the upper cowl 31, a side cowl 33 covering sides of the vehicle body frame 2, a duct cover 34 covering a rear side portion of the inlet duct 22, a seat cowl 35 covering a lower portion of the seat 8 on the rear portion of the vehicle body frame 2, a front fender 36 covering an upper portion of the front wheel 5, and a rear fender 37 covering a rear upper portion of the rear wheel 15.

Designated in FIG. 1 at 41 is a head lamp, 42 a mirror, 43 a radiator, 44 seat rails 45 rider's steps, and 46 passenger's steps.

Figure 2:
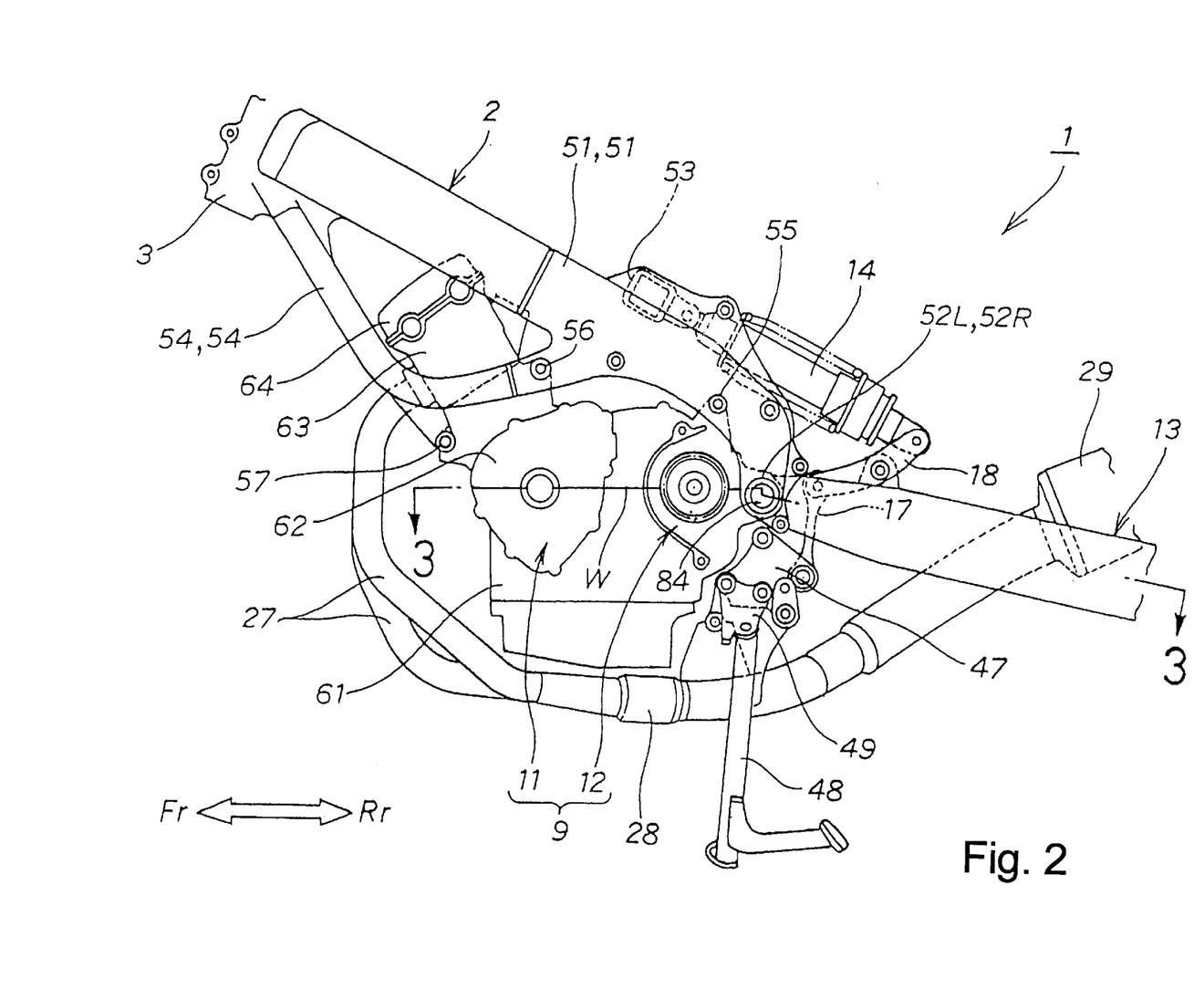
FIG. 2 is a fragmentary side elevational view of the motorcycle according to the present invention.

FIG. 2 is a fragmentary side elevational view of the motorcycle according to the present invention. FIG. 2 shows a specific structure by which the power unit 9 and the rear fork 13 are mounted on the vehicle body frame 2.

The vehicle body frame 2 comprises a pair of right and left main frames 51 (hereinafter only the left main frame shown in FIG. 2) extending rearwardly and downwardly from the head pipe 3 and having rear ends extending downwardly, a pair of right and left pivot supports 52R, 52L mounted on lower ends of the right and left main frames 51, a cross member 53 extending between longitudinal central portions of the main frames 51, and a pair of right and left auxiliary frames 54, each substantially V-shaped as viewed in side elevation, extending between a lower portion of the head pipe 3 and lower sides of the longitudinal central portions of the main frames 51.

The power unit 9 is fastened by bolts at hangers 55 through 57 thereof to the vehicle body frame 2.

The engine 11 comprises a water-cooled four-cylinder engine which is greatly inclined forwardly and upwardly. The engine 11 comprises a lower crankcase 61 and an upper cylinder block 62 which double as a transmission case. Stated otherwise, the crankcase 61 and the cylinder block 62 serve as an overall case of the power unit 9. A main stand 48 and a bracket 49 for a side stand are mounted to a rear portion of the crankcase 61 by right and left stand attachment brackets 47. Designated at 63 is a cylinder head, and 64 a head cover.

A suspension structure for the rear fork 13 will be described in specific detail below.

The suspension structure for the rear fork 13 comprises a progressive suspension structure. Specifically, a front end of the rear fork 13 is mounted on the right and left pivot supports 52R, 52L by a pivot shaft 84, and a first link 17 has an end coupled to the right and left stand attachment brackets 47. The other end of the first link 17, a front upper portion of the rear fork 13, and a rear end of the rear suspension 14 are coupled to each other by a second link 18. The rear suspension 14 has a front end vertically swingably mounted on the cross member 53.

The pivot shaft 84 has its center positioned lower than a mating surface W between the crankcase 61 and the cylinder block 62.

Figure 3:
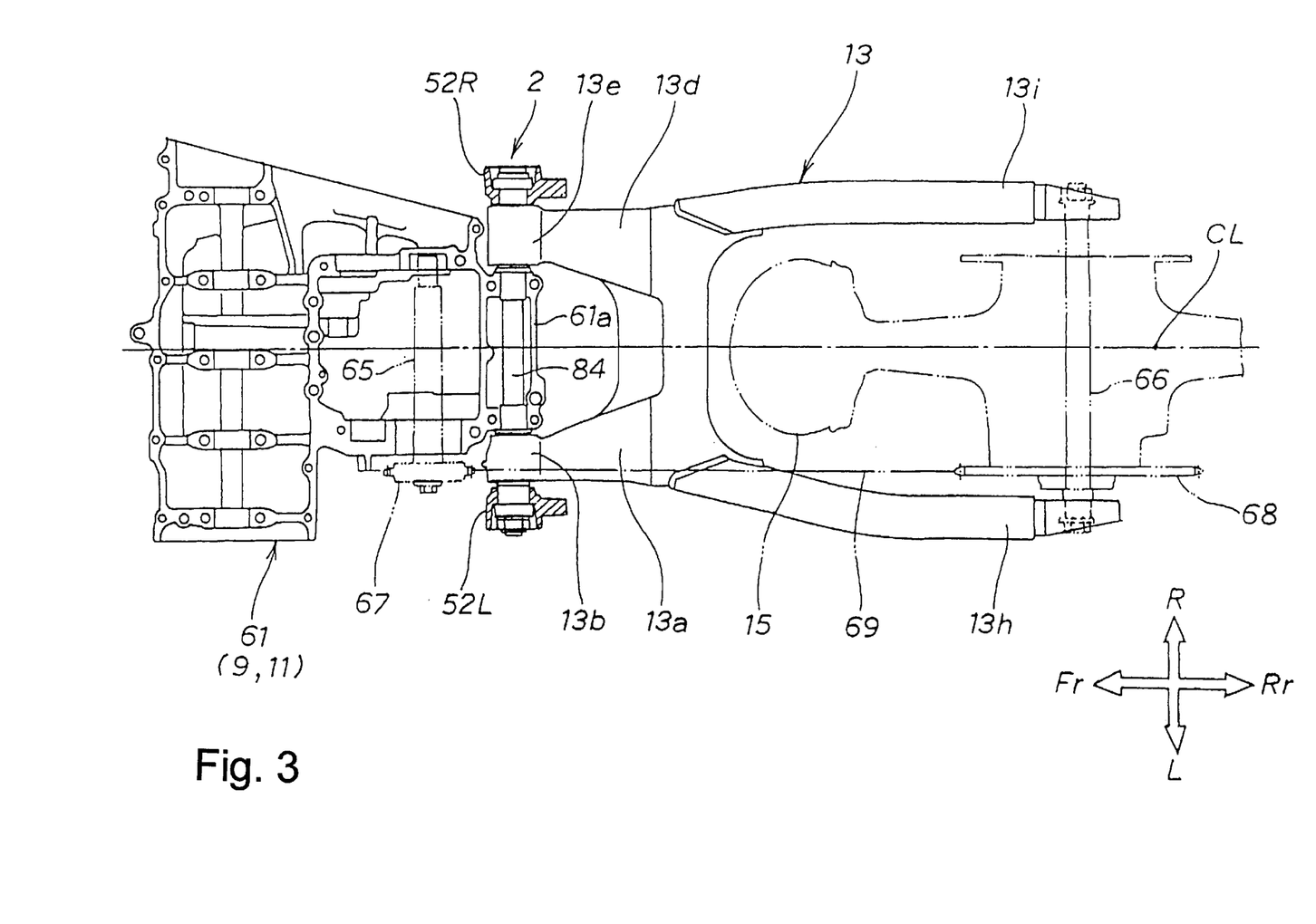
FIG. 3 is a cross-sectional view taken along line 3—3 of FIG. 2.

FIG. 3 is a cross-sectional view taken along line 3—3 of FIG. 2, and shows the relationship between the vehicle body frame 2, the engine 11 of the power unit 9, and the rear fork 13. For an easier understanding, only a lower side of the crankcase 61 of the power unit 9 is shown.

The rear fork 13 comprises a substantially H-shaped member as viewed in plan and has a left arm 13a and a right arm 13d on its front end and a left leg 13h and a right leg 13i on its right end. The rear wheel 15 is mounted on the right and left legs 13i, 13h.

The crankcase 61 of the engine 11 has a pivot portion 61a integrally formed with a rear end thereof. The right and left arms 13d, 13a of the rear fork 13 are vertically swingably mounted in position by the pivot portion 61a and the right and left pivot supports 52R, 52L.

Designated in FIG. 3 at 65 is a drive shaft of the power unit, 66 a rear wheel axle, 67 a drive sprocket, 68 a driven sprocket, and 69 a drive chain.

Figure 4:
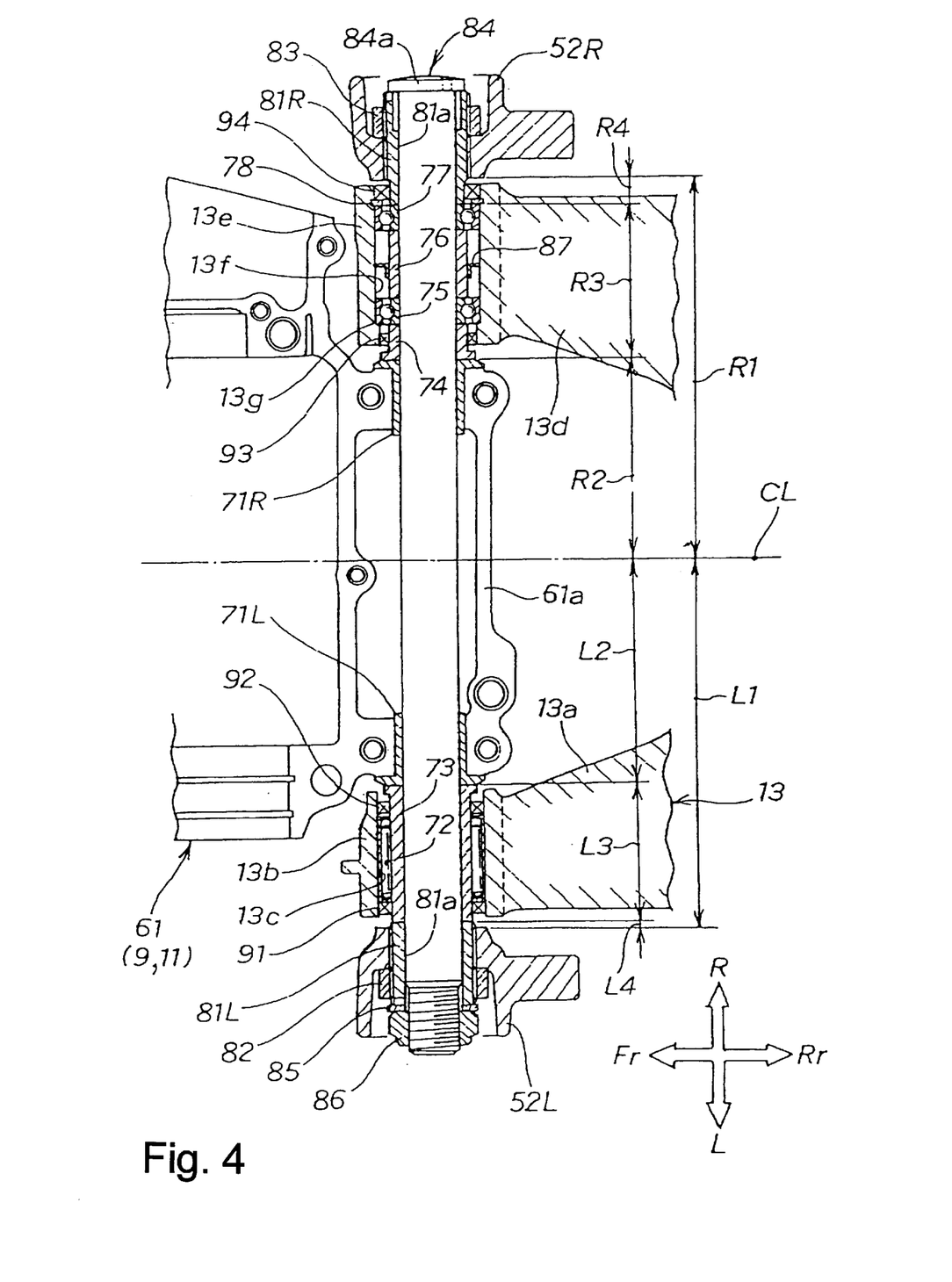
FIG. 4 is a sectional plan view of a rear fork structure according to the present invention.

FIG. 4 is a sectional plan view of a rear fork attachment structure according to the present invention.

As described above, the power unit 9 is integrally fastened to the vehicle body frame 2 by bolts. The crankcase 61, which also doubles as the overall case of the power unit 9, is an extremely rigid case as well known in the art. According to the present invention, the rear fork 13 is supported by the highly rigid crankcase (engine case) 61 and the right and left pivot supports 52R, 52L of the vehicle body frame 2.

The rear fork attachment structure is arranged as follows: The engine 11 is disposed in axial alignment with a vehicle body center CL or in substantial axial alignment with a vehicle body center CL, and the pivot portion 61a of the engine 11 is disposed in axial alignment with the vehicle body center CL or in substantial axial alignment with the vehicle body center CL. The right and left arms 13d, 13a of the rear fork 13 extend over right and left sides of the pivot portion 61a, the right and left pivot supports 52R, 52L extend over right and left sides of the right and left arms 13d, 13a, and the left pivot support 52L, the left arm 13a, the pivot portion 61a, the right arm 13d, and the right pivot support 52R are coupled together by the single pivot shaft 84. The right and left pivot supports 52R, 52L include respective right and left adjustment bolts 81R, 81L attached thereto.

Specifically, the pivot portion 61a comprises a member having a predetermined width. Right and left flanged bushings 71R, 71L are mounted in respective right and left ends of the pivot portion 61a. The pivot shaft 84 is fitted in the holes in the right and left flanged bushings 71 R, 71 L.

The left arm 13a of the rear fork 13 has a left attachment 13b on its front end which has a bearing hole 13c defined therein. A first bearing 72 is mounted in the bearing hole 13c, and a first collar 73 longer than the width of the left attachment 13b is fitted in the first bearing 72. The pivot shaft 84 is fitted in the hole in the first collar 73.

The first bearing 72 is a bearing having a position in the axial direction of the left arm 13a (the thrust direction, i.e., the axial direction of the pivot shaft 84) which is not predetermined. The first bearing 72 includes a needle bearing or the like. Stated otherwise, the first bearing 72 is a bearing mounted in the left arm 13a so as not to have a prescribed axial position thereof The first collar 73 is axially slidably fitted in the first bearing 72, and held against the left end surface of the left bushing 71L.

The right arm 13d of the rear fork 13 has a right attachment 13e on its front end which has a stepped bearing hole 13f defined therein. A second collar 74, a second bearing 75, a third collar 76, and a third bearing 77 are mounted in the bearing hole 13f successively in the order named from the vehicle body center CL, and locked against dislodgment by a retaining ring 78 through the right attachment 13e.

The second and third collars 74, 76 and the second and third bearings 75, 77 are fitted over the pivot shaft 84. The second collar 74 has such a length that its left end projects from the left end surface of the right attachment 13e into contact with the right bushing 71R. The stepped bearing hole 13f has a step 13g serving to establish the position of an outer race of the second bearing 75. The third collar 76 serves as a member for establishing the distance between inner races of the second and third bearings 75, 77. The third bearing 77 is positioned inwardly of the right end surface of the right attachment 13e.

Since the right attachment 13e has the step 13g and the retaining ring 78, the second and third bearings 75, 77 have their position-unchanged in the axial direction (the thrust direction) with respect to the right attachment 13e. The second and third bearings 75, 77 serve as bearings having positions in the axial direction (the thrust direction) of the right arm 13d which are predetermined. The second and third bearings 75, 77 include ball bearings or the like. Stated otherwise, the second and third bearings 75, 77 are bearings mounted in the right arm 13d so as to have prescribed axial positions thereof.

The left pivot support 52L has the left adjustment bolt 81L which has a pivot shaft insertion hole 81a defined therein. The pivot shaft 84 is fitted in the pivot shaft insertion hole 81a. The left adjustment bolt 81L is threaded in the left pivot support 52L for movement along the axis of the pivot shaft 84, and has a distal end movable into and out of contact with the left end of the first collar 73. A lock nut 82 is threaded over the left adjustment bolt 81L.

The right pivot support 52R has the right adjustment bolt 81R which has a pivot shaft insertion hole 81a defined therein, and the pivot shaft 84 is fitted in the pivot shaft insertion hole 81a. The right adjustment bolt 81R is threaded in the right pivot support 52R for movement along the axis of the pivot shaft 84, and has a distal end movable into and out of contact with the right end surface of the inner race of the third bearing 77. A lock nut 83 is threaded over the right adjustment bolt 81R.

The pivot shaft 84 comprises a bolt with a head 84 which is inserted in the left adjustment bolt 81L, the first collar 73, the right and left bushings 71R, 71L, the second collar 74, the second bearing 75, the third collar 76, the third bearing 77, and the right adjustment bolt 81R. A nut 86 is tightened on the pivot shaft 84 with a washer 85 interposed therebetween.

Each of the right and left bushings 71R, 71L, the second and third collars 73, 74, 76, the right and left adjustment bolts 81R, 81L comprises a substantially cylindrical body. The third collar 76 has a stopper 87 or its outer circumferential surface. The stopper 87 serves as a member for preventing the third collar 76 from being displaced out of coaxial alignment when the pivot shaft 84 is removed. Designated in FIG. 4 at 91 through 94 are dust seals.

The principles of adjustment using the right and left adjustment bolts 81R, 81L will be described below with reference to FIG. 5.

Figure 5:
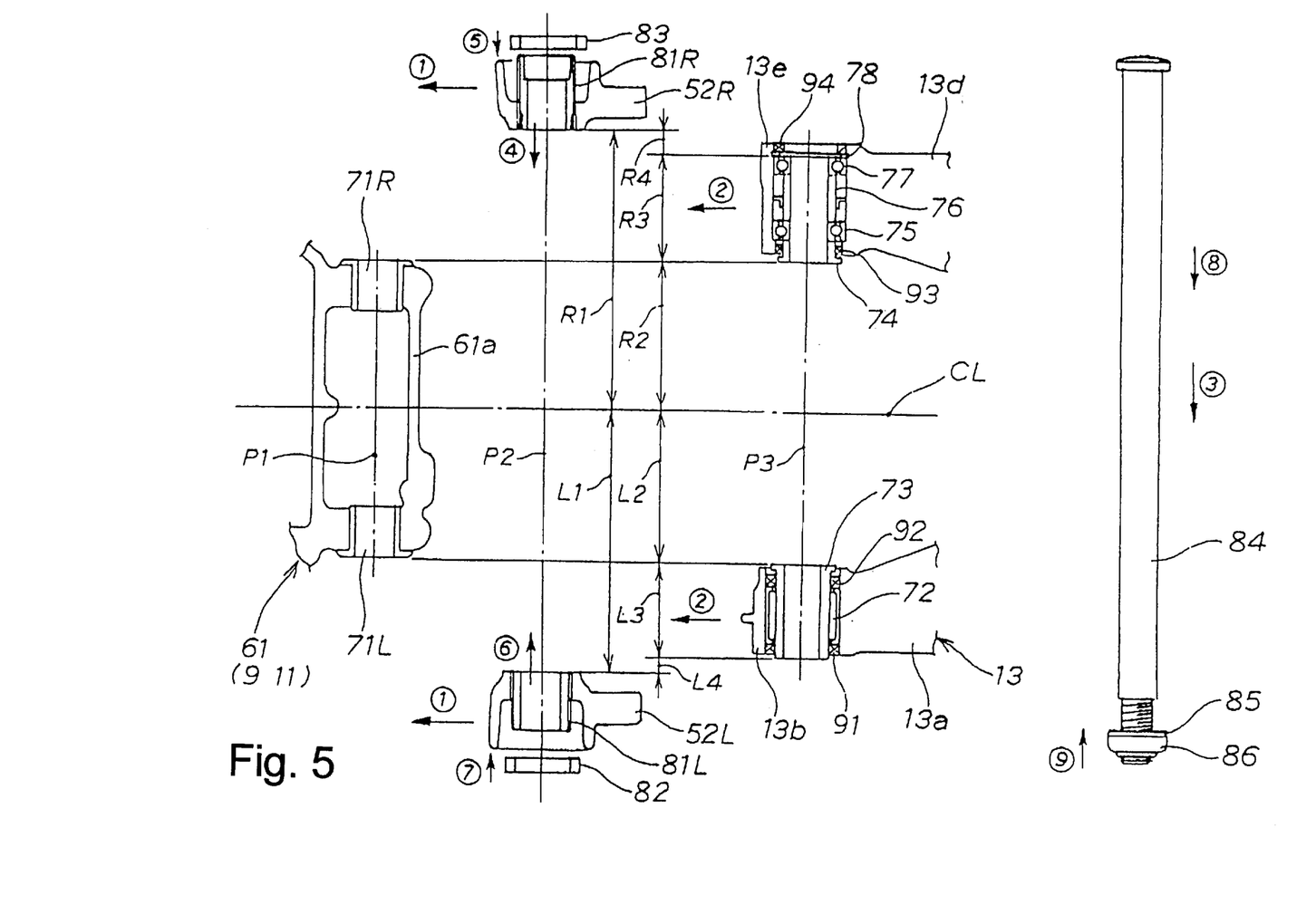
FIG. 5 is a view illustrative of the principles of adjustment for the rear fork attachment structure according to the present invention.

FIG. 5 is a view illustrative of the principles of adjustment for the rear fork attachment structure according to the present invention.

When the center P2 of the right and left pivot supports 52R, 52L is aligned with the center P1 of the pivot portion 61a (the arrow ①), and the right and left arms 13d, 13a are pulled in between the right and left pivot supports 52R, 52L and the pivot portion 61a, (the arrow ②) until the center P3 of the right and left arms 13d, 13a is aligned with the center P1 of the pivot portion 61a, the following equations (1) and (2) are satisfied:

$$L4 = L1 - L2 - L3 \tag{1}$$

$$R4 = R1 - R2 - R3 \tag{2}$$

where

L1: the distance from the vehicle body center CL to the right end surface of the left pivot support 52L;

L2: the distance from the vehicle body center CL to the left end surface of the left bushing 71L;

L3: the length of the first collar 73;

L4: the left adjustment clearance;

R1: the distance from the vehicle body center CL to the left end surface of the right pivot support 52R;

R2: the distance from the vehicle body center CL to the right end surface of the right bushing 71R;

R3: the distance from the left end surface of the second collar 74 to the right end surface of the third bearing 77; and R4: the right adjustment clearance.

The left adjustment clearance L4 represents the distance between the left arm 13a and the left pivot support 52L, i.e., the distance from the left end surface of the first collar 73 to the right end surface of the left pivot support 52L.

The right adjustment clearance R4 represents the distance between the right arm 13d and the right pivot support 52R, i.e., the distance from the right end surface of the third collar 77 to the left end surface of the right pivot support 52R.

As is clear from the above equations (1) and (2), when the left adjustment clearance L4 is adjusted by the left adjustment bolt 81L, the distance between the left arm 13a and the left pivot support 52L can be adjusted.

Furthermore, when the right adjustment clearance R4 is adjusted by the right adjustment bolt 81R, the distance between the right arm 13d and the right pivot support 52R can be adjusted.

A process of assembling and adjusting the rear fork attachment structure of the above construction will be described below with reference to FIGS. 6 and 7. The process of assembling and adjusting the rear fork attachment structure is illustrated for an easier understanding of the construction thereof. The present invention is not limited to the illustrated process.

Figure 6:
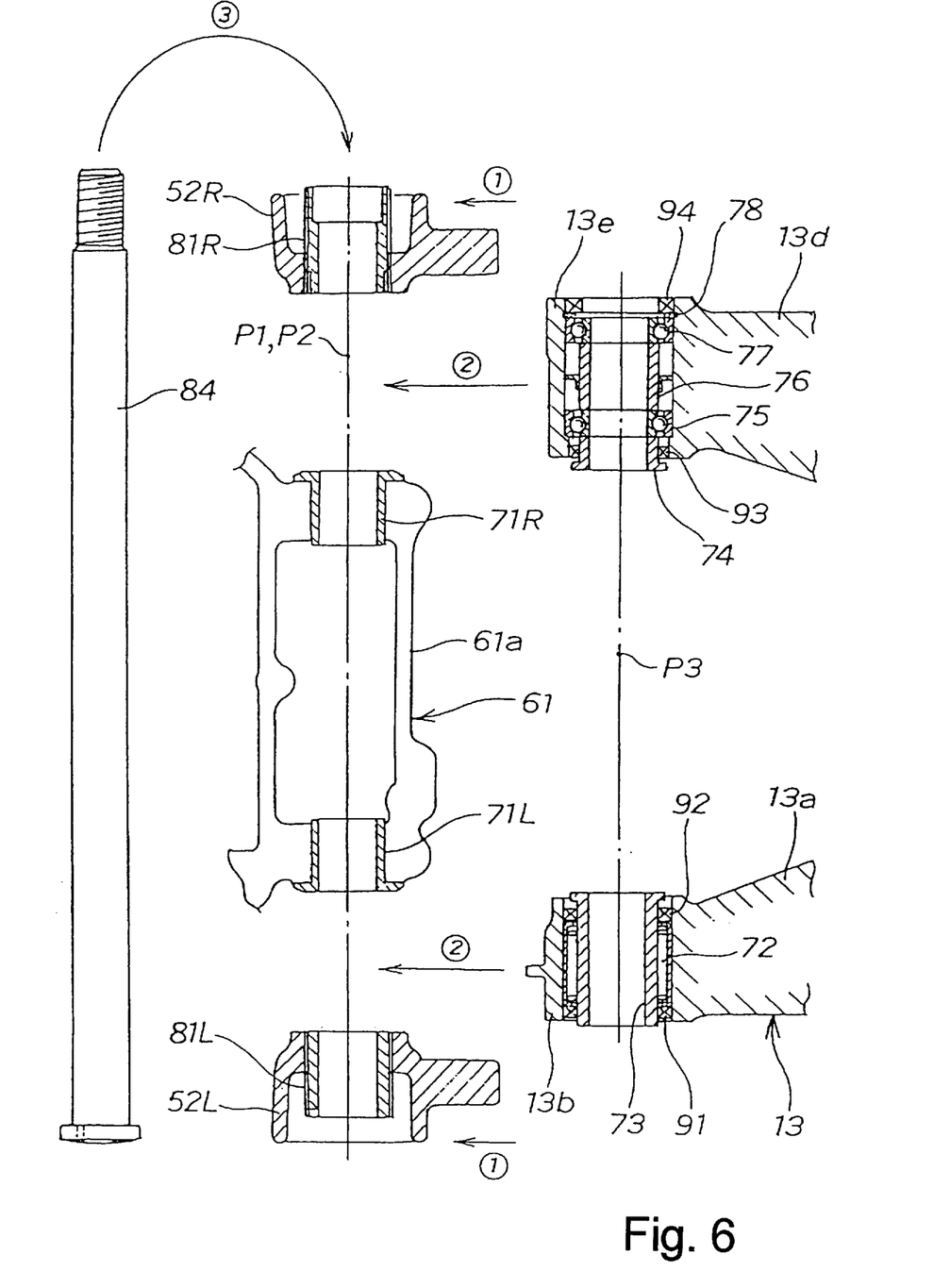
FIG. 6 is a view illustrative of the process of assembling and adjusting the rear fork attachment structure (part 1)

FIG. 6 is a view illustrative of the process of assembling and adjusting the rear fork attachment structure (part 1).

(1) The right and left bushings 71R, 71L are mounted on the pivot portion 61a.

(2) The first bearing 72, the first collar 73, and the dust seals 91, 92 are mounted in the left attachment 13b of the rear fork 13. At this time, the first collar 73 is displaced outwardly (to the left) to facilitate assembly of the parts.

(3) The second collar 74, the second bearing 75, the third collar 76, the third bearing 77, the retaining ring 78, and the dust seals 93, 94 are mounted in the right attachment 13e of the rear fork 13.

(4) The left adjustment bolt 81L is threaded into the left pivot support 52L to a position near the right end surface thereof. The right adjustment bolt 81R is threaded into the right pivot support 52R to a position near the left end surface thereof. The preparatory process for assembly of the parts is now completed.

(5) The center P1 of the pivot portion 61a and the center P2 of the right and left pivot supports 52R, 52L are aligned with each other (the arrow ①). The power unit 9 is installed on the vehicle body frame 2, as shown in FIG. 2.

(6) The right and left attachments 13e, 13b are pulled in between the right and left pivot supports 52R, 52L and the pivot portion 61a (the arrow ②). The center P3 of the right and left attachments 13e, 13b is aligned with the center P1 of the pivot portion 61a.

(7) The pivot shaft 84 is inserted into the left adjustment bolt 81L, the first collar 73, the right and left bushings 71R, 71L, the second collar 74, the second bearing 75, the third collar 76, the third bearing 77, and the right adjustment bolt 81R (the arrow ③).

Figure 7:
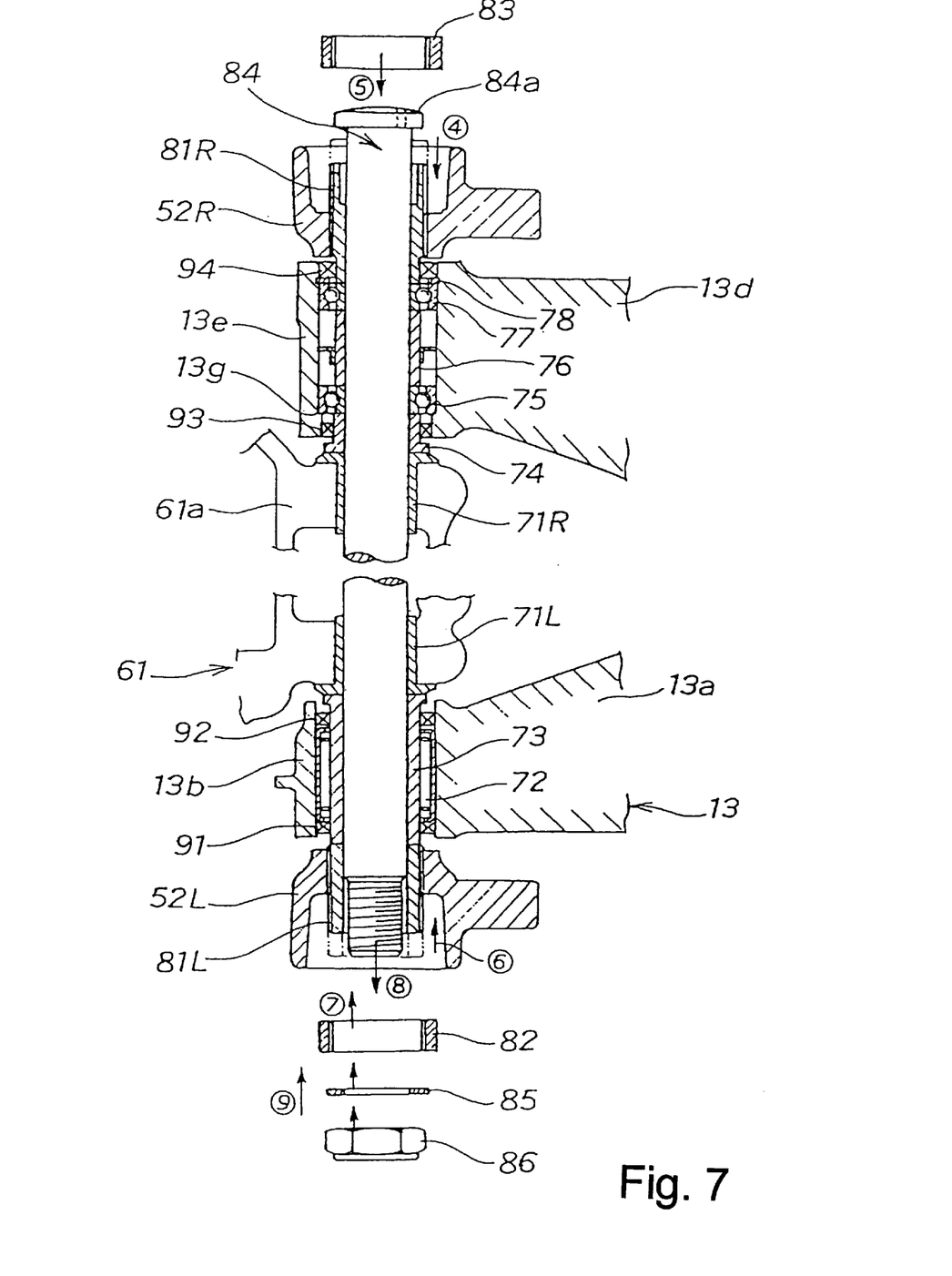
FIG. 7 is a view illustrative of the process of assembling and adjusting the rear fork attachment structure (part 2).

FIG. 7 is a view illustrative of the process of assembling and adjusting the rear fork attachment structure (part 2), showing that the pivot shaft 84 has been inserted partly into the left adjustment bolt 81L. With the pivot shaft 84 inserted partly into the left adjustment bolt 81L, the head 84a of the pivot shaft 84 does not present an obstacle when the right adjustment bolt 81R is adjusted.

(8) The distance between the right arm 13d and the right pivot support 52R is adjusted by the right adjustment bolt 81R. Specifically, the right adjustment bolt 81R is threaded until no clearance is present anywhere from the right end surface of the right bushing 71R to the distal end of the right adjustment bolt 81R (the arrow ④). The position of the rear fork with respect to the pivot portion 16a is now established.

(9) The right adjustment bolt 81R is locked in position by the lock nut 83 (the arrow ⑤).

(10) The distance between the left arm 13a and the left pivot support 52L is adjusted by the left adjustment bolt 81L. Specifically, the left adjustment bolt 81L is threaded to push the first collar 73 into abutment against the left end surface of the left bushing 71L (the arrow ⑥).

(11) The left adjustment bolt 81L is locked in position by the lock nut 82 (the arrow ⑦).

(12) The pivot shaft 84 is completely inserted (the arrow ⑧).

(13) The washer 85 is fitted over the pivot shaft 84, and the nut 86 is threaded over the pivot shaft 84 to couple the left pivot support 52L, the left arm 13a, the pivot portion 61a, the right arm 13d, and the right pivot support 52R together (the arrow ⑨). The process of installing the rear fork is now completed.

Since the right attachment 13e has the step 13g and the retaining ring 78, the positions of the second and third collars 74, 76 and the second and third bearings 75, 77 in the axial direction (the thrust direction, i.e., the axial direction of the pivot shaft 84) with respect to the right attachment 13e remain unchanged. On the other hand, the position of the first collar 73 in the axial direction with respect to the left attachment 13b is variable.

Specifically, the rear fork 13 has the bearings 75, 77 disposed in one of the right and left arms 13d, 13a and having prescribed axial positions thereof, and the bearing 72 disposed in the other of the right and left arms 13d, 13a and having no prescribed axial position thereof. Therefore, when the adjustment bolt for one of the left attachment 13b and the right adjustment 13e is adjusted, i.e., when the position of either one of the adjustment bolts is adjusted prior to the other, the position of the rear fork 13 with respect to the vehicle body center CL is automatically established. It is an arbitrary decision to select the adjustment bolt to be adjusted first.

For example, the right adjustment bolt 81R may be adjusted so that no clearance is present anywhere from the pivot portion 61a to the right pivot support 52R, and thereafter the left adjustment bolt 81L may be adjusted so that no clearance is present anywhere from the pivot portion 61a to the left pivot support 52L. In this manner, simply by adjusting the right and left adjustment bolts 81R, 81L without paying attention to the positioning of the rear fork 13, it is possible to eliminate any clearance between the pivot portion 61a and the right and left arms 13d, 13a and any clearance between the right and left arms 13d, 13a and the right and left pivot supports 52R, 52L. Therefore, the adjustment process is easy to carry out.

Inasmuch as there is no clearance, when the pivot shaft 84 and the nut 86 are tightened together from both sides of the right and left pivot supports 52R, 52L, bending moments due to the tightening forces do not act on the vehicle body frame 2 (see FIG. 2) and the rear fork 13.

In the above embodiment, the rear wheel suspension may be of the type which allows the rear fork 13 to swing, and is not limited to the progressive suspension structure.

The pivot portion 61a is not limited to the structure on which the right and left bushings 71R, 71L are mounted, but may be of a structure where the pivot shaft 84 is directly fitted in the pivot portion 61a.

The structure of the left arm 13a and the structure of the right arm 13d may be switched around.

The above arrangement of the present invention offers the following advantages:

According to the first aspect of the present invention, there is provided a rear fork attachment structure for motorcycles, of the type wherein an engine is disposed substantially centrally in a vehicle body, right and left arms of a rear fork extend over right and left sides of a pivot portion of the engine, right and left pivot supports depending from a vehicle body frame extend over right and left sides of the right and left arms, and the left pivot support, the left arm, the pivot portion, the right arm, and the right pivot support are coupled together by a single pivot shaft. Therefore, the rear fork can be supported by a highly rigid engine case mounted on the vehicle body frame and the right and left pivot supports of the vehicle body frame. With the highly rigid engine case being used, the rigidity of the portion of the vehicle body frame on which the rear fork is mounted is increased.

Furthermore, the right and left pivot supports have adjustment bolts having respective pivot shaft insertion holes. The adjustment bolts adjust distances between the right and left arms and the right and left pivot supports. Therefore, any clearance between the pivot portion of the engine and the right and left arms and any clearance between the right and left arms and the right and left pivot supports can be eliminated simply by adjusting the right and left adjustment bolts. Inasmuch as there is no clearance, when the pivot shaft is tightened from both sides of the right and left pivot supports, bending moments due to the tightening forces do not act on the vehicle body frame and the rear fork.

Accordingly, the right and left arms of the rear fork can reliably be attached to the pivot portion of the engine and the right and left pivot supports without undue attachment loads imposed thereon. Furthermore, no special dimensional management for the parts is necessary in the area where the rear fork is mounted, resulting in an increase in the productivity of the rear fork attachment structure. Because the rear wheel suspension of the type where the rear fork swings provides stable performance, preferable maneuverability of the motorcycle can be maintained.

According to the second aspect of the present invention, the rear fork is pivotally supported on the pivot shaft by bearings, and the bearings include a bearing mounted in one of the right and left arms so as to have a prescribed axial position thereof and a bearing mounted in the other of the right and left arms so as not to have a prescribed axial position thereof. Thus, when the adjustment bolt for one of the right and left arms is adjusted, the position of the rear fork with respect to the center of the vehicle body is automatically established. Accordingly, the right and left adjustment bolts may simply be adjusted without paying attention to the positioning of the rear fork, and hence the adjustment operation can easily be performed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A rear fork attachment structure for a motorcycle, the motorcycle including an engine disposed substantially centrally in a vehicle body, right and left arms of a rear fork extending over right and left sides of a pivot portion of the engine, right and left pivot supports depending from a vehicle body frame extend over right and left sides of the right and left arms, and the left pivot support, the left arm, the pivot portion, the right arm, and the right pivot support are coupled together by a single pivot shaft, said rear fork attachment structure comprising:

adjustment bolts located at the right and left pivot supports, each of the adjustment bolts including pivot shaft insertion holes formed therein, said adjustment bolts being capable of adjusting a distance between the right and left arms and a distance between the right and left pivot supports, respectively.

2. The rear fork attachment structure for a motorcycle according to claim 1, further comprising bearings for pivotally mounting the rear fork on said pivot shaft, said bearings including a first bearing mounted in one of said right and left arms, said first bearing not having a prescribed axial position, and a second bearing mounted in the other of said right and left arms, said second bearing having a prescribed axial position.

3. The rear fork attachment structure for a motorcycle according to claim 2, wherein an outer race of said second bearing is received against a stepped portion formed in said other of said right and left arms to provide a prescribed axial position to said second bearing, and wherein an outer race of said first bearing is not received against a stepped portion of said one of said right and left arms so that the axial position of the second bearing is not prescribed.

4. The rear fork attachment structure for a motorcycle according to claim 3, further comprising a third bearing for being mounted in said other of said right and left arms, said third bearing having a prescribed axial position.

5. The rear fork attachment structure for a motorcycle according to claim 4, further comprising:

a first collar axially slidably fitted in said first bearing, said first collar is longer than a width of an attachment portion of said one of said right and left arms; and a second collar, said second collar having a length such that an end of said second collar projects from an end surface of an attachment portion of said other of said right and left arms; and a third collar, said third collar being located between and establishing a distance between inner races of said second and third bearings.

6. The rear fork attachment structure for a motorcycle according to claim 1, wherein said adjustment bolts include threads formed thereon for cooperating with threads formed on the right and left pivot supports, respectively, to adjust the distance between the right and left arms and the right and left pivot supports, respectively.

7. A motorcycle having a rear fork attachment structure comprising:

a vehicle body;

an engine disposed substantially centrally in the vehicle body, said engine including a pivot portion formed thereon;

a rear fork including right and left arms extending over right and left sides of said pivot portion of the engine;

a vehicle body frame including right and left pivot supports depending therefrom, said right and left pivot supports extending over right and left sides of the right and left arms a single pivot support for coupling the left pivot support, the left arm, the pivot portion, the right arm, and the right pivot support together; and adjustment bolts located at the right and left pivot supports, each of the adjustment bolts including pivot shaft insertion holes formed therein, said adjustment bolts being capable of adjusting a distance between the right and left arms and a distance between the right and left pivot supports, respectively.

8. The motorcycle according to claim 7, further comprising bearings for pivotally mounting the rear fork on said pivot shaft, said bearings including a first bearing mounted in one of said right and left arms, said first bearing not having a prescribed axial position, and a second bearing mounted in the other of said right and left arms, said second bearing having a prescribed axial position.

9. The motorcycle according to claim 8, wherein an outer race of said second bearing is received against a stepped portion formed in said other of said right and left arms to provide a prescribed axial position to said second bearing, and wherein an outer race of said first bearing is not received against a stepped portion of said one of said right and left arms so that the axial position of the second bearing is not prescribed.

10. The motorcycle according to claim 9, further comprising a third bearing mounted in said other of said right and left arms, said third bearing having a prescribed axial positon.

11. The motorcycle according to claim 10, further comprising:

a first collar axially slidably fitted in said first bearing, said first collar is longer than a width of an attachment portion of said one of said right and left arms; and a second collar, said second collar having a length such that an end of said second collar projects from an end surface of an attachment portion of said other of said right and left arms; and a third collar, said third collar being located between and establishing a distance between inner races of said second and third bearings.

12. The motorcycle according to claim 7, wherein said adjustment bolts include threads formed thereon for cooperating with threads formed on the right and left pivot supports, respectively, to adjust the distance between the right and left arms and the right and left pivot supports, respectively.

13. A method of assembling and adjusting a rear fork attachment structure for a motorcycle, comprising the steps of:

mounting a first bearing in a left attachment portion of a rear fork;

mounting a second bearing in a right attachment portion of the rear fork;

threading a left adjustment bolt into a left pivot support and a right adjustment bolt into a right pivot support;

inserting a pivot shaft into the left adjustment bolt, the second bearing, the third bearing and the right adjustment bolt;

adjusting a distance between the right attachment portion and the right pivot support by adjusting the right adjustment bolt; and adjusting a distance between the left attachment portion and the left pivot support by adjusting the left adjustment bolt.

14. The method according to claim 13, wherein the step of mounting the first bearing includes the step of mounting a first collar and dust seals in the left attachment portion of the rear fork, and the step of mounting the second bearing includes the step of mounting a third bearing, a retaining ring and dust seals in the right attachment portion of the rear fork.

15. The method according to claim 14, further comprising the steps of:

mounting right and left bushings on a pivot portion of an engine;

aligning a center of the pivot portion and centers of the right and left pivot supports with each other;

pulling the right and left attachment portions between the right and left pivot supports to align a center of the right and left attachment portions with the center of the pivot portion.

16. The method according to claim 15, wherein the step of inserting the pivot shaft includes the step of inserting the pivot shaft into the first collar, the right and left bushings, and the second and third collars.

* * * * *